US008071708B2

(12) United States Patent
Ritter et al.

(10) Patent No.: US 8,071,708 B2
(45) Date of Patent: Dec. 6, 2011

(54) CLICK-REACTION CROSSLINKABLE MULTICOMPONENT SILICONE COMPOSITIONS

(75) Inventors: Stefan Ritter, Mehring (DE); Friedrich Sieglhuber, Ranshofen (AT)

(73) Assignee: Wacker Chemie AG, Munich (DE)

( * ) Notice: Subject to any disclaimer, the term of this patent is extended or adjusted under 35 U.S.C. 154(b) by 260 days.

(21) Appl. No.: 12/510,534

(22) Filed: Jul. 28, 2009

(65) Prior Publication Data
US 2010/0029888 A1 Feb. 4, 2010

(30) Foreign Application Priority Data

Jul. 31, 2008 (DE) .......................... 10 2008 040 886

(51) Int. Cl.
*C08G 77/20* (2006.01)
(52) U.S. Cl. ............................. 528/32; 528/28; 528/38
(58) Field of Classification Search .................... 528/32, 528/28, 38
See application file for complete search history.

(56) References Cited

U.S. PATENT DOCUMENTS

2007/0141363 A1* 6/2007 Acosta et al. .................. 428/447

FOREIGN PATENT DOCUMENTS

| DE | 10011644 A1 | 9/2001 |
|---|---|---|
| WO | 0110914 A1 | 2/2001 |
| WO | 2007/075285 A1 | 7/2007 |
| WO | 2007/132000 A1 | 11/2007 |
| WO | 2007132005 A2 | 11/2007 |

OTHER PUBLICATIONS

Opsteen, J.A., van Hest, J.C.M., Modular synthesis of block copolymers via cycloaddition of terminal azide and alkyne functionalized polymers, ChemCom, No. 1, Jan. 7, 2005, pp. 57-59.
Rostovtsev, V.V., Green, L.G., Fokin, V.V., Sharpless, K.B., "A Stepwise Huisgen Cycloaddition Process: Copper(I)-Catalyzed Regioselective "Ligation" of Azides and Terminal Alkynes", Angew. Chem. Int. Ed. 2002, 41, No. 14, pp. 2569-2599.
Ossipov, D.A., Hilborn, J., "Poly(vinyl alcohol)-Based Hydrogels Formed by 'Click Chemistry'", Macromolecules 2006, 39, pp. 1709-1718.
Parrish, B., Breitenkamp, R.B., Emrick, T., "PEG- and Peptide-Grafted Aliphatic Polyesters by Click Chemistry", J. Am. Chem. Soc. 2005, 127, pp. 7404-7410.
Wang, Q., Chan, T.R., Hilgraf, R., Fokin, V.V., Sharpless, K.B., Finn, M.G., "Bioconjugation by Copper(I)-Catalyzed Azide-Alkyne [3+2] Cycloaddition", J. Am. Chem. Soc. 2003, 125, pp. 3192-3193.

Binder, W.H., Sachsenhofer, R., "'Click' Chemistry in Polymer and Materials Science", Macromol. Rapid Commun. 2007, 28, pp. 15-54.
Lutz, J.-F., "1,3-Dipolar Cycloadditions of Azides and Alkynes: A Universal Ligation Tool in Polymer and Materials Science", Angew. Chem. Int. Ed. 2007, 46, pp. 1018-1025.
Wu, P., Feldman, A.K., Nugent, A.K., Hawker, C.J., Scheel, A., Voit, B., Pyun, J., Frechet, J.M.J., Sharpless, K.B., Fokin, V.V., "Efficiency and Fidelity in a Click-Chemistry Route to Triazole Dendrimers by the Copper(I)-Catalyzed Ligation of Azides and Alkynes", Angew. Chem. Int. Ed. 2004, 43, pp. 3928-3932.
Malkoch, M., Schleicher, K., Drockenmuller, E., Hawker, C.J., Russell, T.P., Wu, P., Fokin, V.V., "Structurally Diverse Dendritic Libraries: A Highly Efficient Functionalization Approach Using Click Chemistry", Macromolecules 2005, 38, pp. 3663-3678.
Rozkiewicz, D.I., Janczewski, D., Verboom, W., Ravoo, B.J., Reinhoudt, D.N., "'Click' Chemistry by Microcontact Printing", Angew. Chem. Int. Ed. 2006, 45, pp. 5292-5296.
Rohde, R.D., Agnew, H.D., Yeo, W.-S., Bailey, R.C., Heath, J.R., "A Non-Oxidative Approach toward Chemically and Electrochemically Functionalizing Si(111)", J. Am. Chem. Soc. 2006, 128, pp. 9518-9525.
Diaz, D.D., Punna, S., Holzer, P., McPherson, A.K., Sharpless, K.B., Fokin, V.V., "Click Chemistry in Materials Synthesis. 1. Adhesive Polymers from Copper-Catalyzed Azide-Alkyne Cycloaddition", J. Polym. Sci: Part A: Polymer Chemistry, vol. 42, 2004, pp. 4392-4403.
Huisgen, R., Szeimies, G., Mobius, L., "Kinetik der Additionen organischer Azide an CC-Mehrfachbindungen", Chem. Ber. 100, 1967, pp. 2494-2507.
Ranjan, R., Brittain, W.J., "Synthesis of Polyacrylamide-Silica Hybrid Nanoparticle Using Raft Polymerization and Click Chemistry", Polymer Preprints 2007, 48(1), pp. 797-798.

* cited by examiner

*Primary Examiner* — Kuo-Liang Peng
(74) *Attorney, Agent, or Firm* — Brooks Kushman P.C.

(57) ABSTRACT

Multicomponent silicone compositions which can be crosslinked via the click reaction and which, after mixing of the individual components, harden to give an elastomeric material contain:
at least one compound (A) or (B),
at least one compound (B) or (C), and
at least one Cu catalyst (D),
where
(A) is an organic compound or an organosilicon compound which possesses at least two moieties having terminal aliphatic carbon-carbon triple bonds having terminally bonded hydrogen;
(B) is an organic compound or an organosilicon compound which possesses at least two moieties having terminal aliphatic carbon-carbon triple bonds having terminally bonded hydrogen and simultaneously at least two moieties having carbon-bonded azide groups;
(C) is an organic compound or an organosilicon compound which possesses at least two moieties having carbon-bonded azide groups.

12 Claims, No Drawings

CLICK-REACTION CROSSLINKABLE MULTICOMPONENT SILICONE COMPOSITIONS

CROSS-REFERENCE TO RELATED APPLICATIONS

This application claims priority to German application DE 10 2008 040 886.7 filed Jul. 31, 2008, which is herein incorporated by reference.

BACKGROUND OF THE INVENTION

1. Field of the Invention

The invention relates to multicomponent silicone compositions which can be crosslinked via the click reaction and which, after mixing of the individual components, harden to give a silicon polymer which is preferably an elastomeric material.

2. Background Art

Platinum-catalyzed hydrosilylation, in particular, and also tin-catalyzed condensation, are crosslinking reactions which have become widely used in the sector of multicomponent silicone compositions crosslinking at room temperature (RTV-2 silicone rubbers). Both types of reaction permit formation of a stable three-dimensional network via linkage of polyorganosiloxanes using suitable crosslinking agents. The systems known as "addition-crosslinking RTV-2 systems" are based on the (mostly platinum-catalyzed) reaction of alkenyl-functional polyorganosiloxanes with SiH-functional oligosiloxanes. The systems known as "condensation-crosslinking RTV-2 systems" are based on the linkage of Si—OH-functional polysiloxanes via polyfunctional silanes having hydrolyzable groups, for example tetraethoxysilane or tetrapropoxysilane or condensates thereof, proceeding in the presence of water, mostly with tin catalysis. Both crosslinking mechanisms permit simple production of vulcanizates having defined network structures, based on the reactions which proceed almost quantitatively under standard conditions. The resultant elastomeric materials feature specific properties. Examples that may be mentioned of these are: high thermooxidative stability, good low-temperature flexibility, and chemical inertness.

Alongside all of these advantages, these systems also have disadvantages. In contrast with addition-crosslinking systems, condensation-crosslinking systems form a network by eliminating low-molecular-weight units, mostly short-chain alcohols, such as methanol or ethanol. The result of diffusion of these substances out of the vulcanizate is not only problematic relating to health and safety, but also results in volume reduction ("shrinkage") of the molding. Furthermore, the tin catalysts used, mostly diorganotin(IV) dicarboxylates, create health- and environment-related risks which are difficult to evaluate.

On the other hand, addition-crosslinking systems require platinum catalysts, which are often considered to have sensitizing properties and moreover incur high raw-material costs. These catalysts are moreover very susceptible to inhibition by chemical compounds which are ubiquitous in the environment, known as catalyst poisons (e.g. amines, thiols). This sometimes considerably restricts the practical use of said systems. Furthermore, there can be a certain excess proportion of the SiH-functional crosslinking agent in addition systems, and this causes post-crosslinking of the vulcanizate. The instability of the SiH function with respect to atmospheric oxygen in the presence of the Pt catalyst leads to conversion to an Si—OH group, which then reacts with further Si—OH groups with elimination of water. The "compression set" resulting from this is a typical disadvantage of addition systems, and can only be mitigated by annealing, which has high energy cost, or by adding specific additives.

These disadvantages are among the reasons for a high level of interest in the use of alternative crosslinking mechanisms, which is a subject of current research. However, processes developed hitherto do not provide any significant advantages, and indeed sometimes result in additional disadvantages. By way of example, the vulcanization of polysiloxanes having a high concentration of vinyl groups, using sulfur or thiols, causes impairment of mechanical properties. Dehydrocondensation between Si—H and Si—OH groups as crosslinking reaction can only be used for the production of thin layers (coatings), since large amounts of hydrogen are produced, and this can foam the material. Radiation-induced crosslinking demands high doses of radiation. The efficiency of the crosslinking reaction under standard conditions is reduced by atmospheric oxygen, and undesired side-reactions occur.

There has long been a need for a crosslinking system for multicomponent silicone rubbers which harden at room temperature to give elastomeric materials without the abovementioned disadvantages. Surprisingly, it has been found that Cu(I)-catalyzed 1,3-dipolar[2+3]cycloaddition (explained in more detail below) between terminal alkynes and azides (hereinafter referred to simply as the "click reaction") has excellent suitability for this purpose.

The origin of Cu(I)-catalyzed 1,3-dipolar[2+3]cycloaddition between terminal alkynes and azides, generally known today as the "click reaction", is found in the uncatalyzed, thermal variant of the reaction studied by Huisgen and Szeimies [Huisgen, R.; Szeimies, G.; Moebius, L.; *Chem. Ber.* 1967, 100, 2494]. This reaction permits the synthesis of 1,4- and 1,5-disubstituted aromatic 1,2,3-triazoles under simple conditions. The catalyzed version of the reaction was discovered in 2002 by Sharpless, who recognized its potential as a highly efficient method of providing linkage between any desired chemical "units" [Lewis, W. G.; Green, L. G.; Grynszpan, F.; Radic, Z.; Carlier, P. R.; Taylor, P.; Finn, M. G.; Sharpless, B. K.; *Angew. Chem., Int. Ed.* 2002, 41, 2596]. Sharpless utilized the reaction in the context of the concept which he had previously named "click chemistry", for the synthesis of biologically active substances and of polymers. The catalytic action of Cu+ ions here is based on the formation of a copper acetylide, which is substantially more reactive toward an azide than the original terminal alkyne. The result is a lowering of the activation energy, or an increase in the reaction rate by a factor of 107 at room temperature [Wang, Q.; Chan, T. R.; Hilgraf, R.; Fokin, V. V.; Sharpless, K. B.; Finn, M. G.; *J. Am. Chem. Soc.* 2003, 125, 3192]. The action of the catalyst is highly specific, requiring retaining the inertness of the two functional groups (azide, alkyne) under the normal physical conditions arising in our environment, and with respect to almost all chemically reactive compounds that occur in these circumstances. The reaction is moreover almost irreversible, contrasting in particular with Diels-Alder cycloadditions. The triazole group formed moreover features high resistance to thermal decomposition and to most reactive chemical compounds, such as oxidants, reducing agents and also acids and alkaline solutions.

These are the reasons for the attractiveness of this type of reaction. Click reactions usually provide almost quantitative conversions, without side-reactions, and are affected very little by external reaction conditions. The click reaction is therefore of great importance for preparative methods in which these features are significant—an example being polymerization reactions.

A brief review of the use of the click reaction in the sector of polymer chemistry and materials science was provided by Lutz, Binder, and Sachsenhofer [Lutz, J.-F.; *Angew. Chem. Int. Ed. Engl.* 2007, 46, 1018. Binder, W. H.; Sachsenhofer, R.; Macromol. Chem. Rapid. Commun. 2007, 28, 15].

By way of example, the click reaction has been utilized for the production of polytriazoles [Diaz, D. D.; Punna, S.; Holzer, P.; McPherson, A. K.; Sharpless, K. B.; Fokin, V. V.; Finn, M. G.; *J. Polym. Sci., Part A: Polym. Chem.* 2004, 42, 4392], block-copolymers [Opsteen, J. A.; van Hest, J. C. M.; *Chem. Commun.* 2005, 57], grafted block-copolymers [Parrish, B.; Breitenkamp, R. B.; Emrick, T.; J. *Am. Chem. Soc.* 2005, 127, 7404], hydrogels [Ossipov, D. A.; Hilborn, J.; *Macromolecules* 2006, 39, 1709] and of dendrimers [Wu, P.; Feldman, A. K.; Nugent, A. K.; Hawker, C. J.; Scheel, A.; Voit, B.; Pyun, J. J.; Frechet, M. J.; Sharpless, K. B.; Fokin, V. V.; *Angew. Chem., Int. Ed.* 2004, 43, 3928. Malkock, M.; Schleicher, K.; Drockenmuller, E.; Hawker, C. J.; Russell, T. P.; Wu, P.; Fokin, V. V.; *Macromolecules* 2005, 38, 3663].

Another example of the use of click reaction is found in combination with polymeric $SiO_2$ [Rozkiewicz, D. I.; Janczewski, D.; Verboom, W.; Ravoo, B. J.; Reinhoudt, D. N.; *Angew. Chem. Int. Ed.* 2006, 45, 5292. Rhode, R. D.; Agnew, H. D.; Yeo, W.-S.; Bailey, R. C.; Heath, J. R.; *J. Am. Chem. Soc.* 2006, 128, 9518. Ranjan, R.; Brittain, W. J.; Polymer Preprints (*Am. Chem. Soc., Div. of Polym. Chem.*) 2008, 48, 797] and with silicones. In WO2007/132005 A2, for example, the use of silicone-hybrid materials is claimed as emulsifiers for cosmetics.

The use of azido-functional silanes, or organosilicon compounds, for the modification of polymeric materials is likewise known—but not in the context of the "click chemistry" concept. WO 0110914 describes the grafting of azidosilanes onto polyethylene via thermal decomposition of the azide groups. DE 10011644 A1 describes the use of azidosilanes as crosslinking agents in coating materials. The reaction of the azide groups here is brought about either via thermal decomposition or via activation by means of electromagnetic radiation.

Despite these versatile applications, the click reaction has not hitherto been used as crosslinking mechanism for the production of elastomeric silicone plastics.

SUMMARY OF THE INVENTION

Significant advantages over addition and condensation cured silicone elastomers have been surprisingly and unexpectedly discovered as a result of employing the click reaction as a crosslinking reaction.

DETAILED DESCRIPTION OF THE PREFERRED EMBODIMENT(S)

The term organosilicon compound hereinafter encompasses polymeric, oligomeric, dimeric, and monomeric siloxanes having Si—C bonds and the term organopolysiloxanes hereinafter encompasses polymeric, oligomeric, and dimeric siloxanes.

The invention provides multicomponent silicone compositions (S) which can be crosslinked via the click reaction and which, after mixing of the individual components, harden to give an elastomeric material, and which comprise
at least one compound (A) or (B),
at least one compound (B) or (C), and
at least one Cu catalyst (D), where
(A) is an organic compound or an organosilicon compound which possesses at least two radicals having terminal aliphatic carbon-carbon triple bonds having terminally bonded hydrogen;
(B) is an organic compound or an organosilicon compound which possesses at least two radicals having terminal aliphatic carbon-carbon triple bonds having terminally bonded hydrogen and simultaneously at least two radicals having carbon-bonded azide groups;
(C) is an organic compound or an organosilicon compound which possesses at least two radicals having carbon-bonded azide groups;
with the proviso that a component does not simultaneously comprise compounds of the group (B) and (D), or simultaneously comprise (A), (C) and (D), and
that at least one of the compounds used, selected from (A), (B) and (C), is an organosilicon compound.

An advantage of the crosslinkable silicone compositions (S) is that they can be produced in a simple process, using readily accessible starting materials, and can therefore be produced cost-effectively. Another advantage of the silicone compositions (S) is that they have good storage stability in the form of a two- or multicomponent formulation at from 0-50° C. and ambient pressure, and crosslink rapidly, but only after mixing of the two components.

Another advantage of the silicone compositions (S) is that the cycloaddition reaction used for crosslinking surprisingly accelerates with the reaction time, since the triazole groups formed have been found to have an autocatalytic effect. This results in an advantageous vulcanization characteristic.

The compounds (A), (B) and (C) used in the multicomponent silicone compositions (S) which can be crosslinked via the click reaction are selected in such a way as to permit crosslinking. By way of example, compound (A) has at least two terminal alkyne groups having terminally bonded hydrogen, and (C) has at least three carbon-bonded azide groups, or compound (A) has at least three terminal alkyne groups having terminally bonded hydrogen, and compound (C) has at least two carbon-bonded azide groups, or else instead of compound (A) and (C) compound (B) is used, and has terminal alkyne groups and simultaneously carbon-bonded azide groups in the abovementioned ratios. Mixtures composed of (A) and (B) and (C) are also possible, having the abovementioned ratios of terminal alkyne groups and carbon-bonded azide groups.

The compound (A) can involve silicon-free organic compounds having at least two terminal aliphatic carbon-carbon triple bonds, known as terminal alkyne groups having terminally bonded hydrogen, or else organosilicon compounds having this same functional group, or else a mixture of these. Compound (A) contains no carbon-bonded azide groups.

Examples of silicon-free organic compounds (A) are aliphatic diynes, branched or unbranched, e.g. 1,3-butadiyne, 1,4-pentadiyne, 1,5-hexadiyne, 1,6-heptadiyne, 1,7-octadiyne, and also higher homologs. Further examples are diprop-2-ynyl ether, dipropargylamine, tripropargylamine, 2,5-diethynyl-2,5-dimethyltetrahydrofuran, 2-propynyl propiolate, tetra(2-propynyloxymethyl)methane, 3-prop-2-ynyloxy-2,2-bisprop-2-ynyloxymethylpropane-1-ol, 5,5-diprop-2-ynylpyrimidine-2,4,6-trione, diethyl diprop-2-ynylmalonate, 1,2-epoxy-2-prop-2-ynyl-pent-4-yne, 2-prop-2-ynylpent-4-ynoic acid, hepta-1,6-diyn-4-ol, 4-prop-2-ynylhepta-1,6-diyn-4-ol, and 4-propylhepta-1,6-diyn-4-ol, 3,3-diprop-2-ynylpentane-2,4-dione. Examples of aromatic compounds are 1,3,5-trisprop-2-ynyloxybenzene, 1,2,3- trisprop-2-ynyloxybenzene, 2,4,6-tris(propargylamino)-1,3,
5-triazine, 1,8-diethynylnaphthalene, and 4-phenylhepta-1,
6-diyn-4-ol, 2-(1-prop-2-ynylbut-3-ynyl)quinoline.

As organosilicon compounds (A), which have SiC-bonded aliphatic radicals having terminal carbon-carbon triple bonds, preferably linear or branched organopolysiloxanes composed of units of the general formula (I)

are used, where
R is an organic or inorganic radical free from aliphatic carbon-carbon triple bonds,
$R^1$ is a monovalent, substituted or unsubstituted, SiC-bonded hydrocarbon radical having at least one aliphatic terminal carbon-carbon triple bond,
a is 0, 1, 2 or 3 and
b is 0, 1, 2 or 3,
with the proviso that the sum a+b is smaller than or equal to 3, and at least 2 radicals $R^1$ are present per molecule.

The radical R can include mono- or polyvalent radicals, and the polyvalent radicals here, e.g. bivalent, trivalent, and tetravalent radicals, then bond a plurality of, e.g. two, three or four, siloxy units of the general formula (I) to one another.

Examples of radicals R are alkyl radicals such as the methyl, ethyl, n-propyl, isopropyl, n-butyl, isobutyl, tert-butyl, n-pentyl, isopentyl, neopentyl, or tert-pentyl radicals, hexyl radicals such as the n-hexyl radical, heptyl radicals such as the n-heptyl radical, octyl radicals such as the n-octyl radical, and isooctyl radicals such as the 2,2,4-trimethylpentyl radicals, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals such as cyclopentyl, cyclohexyl, cycloheptyl and methylcyclohexyl radicals, alkenyl radicals such as the vinyl and allyl radicals, aryl radicals such as the phenyl, naphthyl, anthryl and phenanthryl radicals, alkaryl radicals such as the o-, m-, or p-tolyl radicals, xylyl radicals and ethylphenyl radicals, and aralkyl radicals such as the benzyl radicals and the α- and β-phenylethyl radicals.

Further examples of R are the monovalent radicals —F, —Cl, —Br, $OR^2$, —CN, —SCN, —NCO, and SiC-bonded, substituted or unsubstituted hydrocarbon radicals, which can be interrupted by oxygen atoms or by the group —C(O)—, and also divalent radicals bilaterally Si-bonded as in the general formula (I). If radical R involves SiC-bonded, substituted hydrocarbon radicals, preferred substituents are halogen atoms, phosphorus-containing radicals, cyano radicals, —$OR^2$, —$NR^2$—, —$NR^2_2$, $NR^2C(O)$—$NR^2_2$, —C(O)—$NR^2_2$, —$C(O)R^2$, —$C(O)OR^2$, —$SO_2$-Ph, and —$C_6F_5$, where $R^2$ is a hydrogen atom or a monovalent hydrocarbon radical having from 1 to 20 carbon atoms, and Ph is a phenyl radical.

Examples of substituted radicals R are haloalkyl radicals such as the 3,3,3-trifluoro-n-propyl radical, the 2,2,2,2',2',2'-hexafluoroisopropyl radical, the heptafluoroisopropyl radical, and haloaryl radicals such as the o-, m- and p-chlorophenyl radicals, —$(CH_2)$—$N(R^2)C(O)NR^2_2$, —$(CH_2)_n$—$C(O)NR^2_2$, —$(CH_2)_n$—$C(O)R^2$, $(CH_2)_n$—$C(O)OR^2$, —$(CH_2)_n$—$C(O)NR^2_2$, —$(CH_2)_n$—$C(O)$—$(CH_2)_m C(O)CH_3$, —$(CH_2)_n$—O—CO—$R^2$, —$(CH_2)_n$—$NR^2$—$(CH_2)_m$—$NR^2_2$, —$(CH_2)_n$ O—$(CH_2)_m CH(OH)CH_2OH$, —$(CH_2)_n (OCH_2CH_2)_m OR^2$, —$(CH_2)_n$—$SO_2$-Ph and —$(CH_2)_n$—O—$C_6F_5$, where $R^2$ and Ph are defined as stated above, and n and m are identical or different whole numbers from 0 to 10.

Examples of R as divalent radicals bilaterally Si-bonded to the general formula (I) are those derived from the monovalent examples mentioned above for radical R by replacing a hydrogen atom by an additional bond, examples of radicals of this type being —$(CH_2)$—, —$CH(CH_3)$—, —$C(CH_3)_2$—, —$CH(CH_3)$—$CH_2$—, —$C_6H_4$—, —$CH(Ph)$—$CH_2$—, —$C(CF_3)_2$—, —$(CH_2)_n$—$C_6H_4$—$(CH_2)_n$—, —$(CH_2)_n$—$C_6H_4$—$C_6H_4$—$(CH_2)_n$—, —$(CH_2O)_m$—, —$(CH_2CH_2O)_m$—, —$(CH_2)_n$—$O_k$—$C_6H_4$—$SO_2$—$C_6H_4$—$O_k$—$(CH_2)_n$—,
where k is 0 or 1, and Ph, m and n are defined as above.

The radical R is preferably a monovalent SiC-bonded, optionally substituted hydrocarbon radical free from aliphatic carbon-carbon multiple bonds and having from 1 to 18 carbon atoms, more preferably a monovalent SiC-bonded hydrocarbon radical free from aliphatic carbon-carbon multiple bonds and having from 1 to 6 carbon atoms, in particular a methyl or phenyl radical.

The radical $R^1$ can be any desired group containing at least one terminal alkyne function. If the radical $R^1$ is an SiC-bonded, additionally substituted hydrocarbon radical, preferred additional substituents are halogen atoms, cyano radicals and —$OR_2$, where $R^2$ is defined as above.

Radical $R^1$ preferably is an aliphatic hydrocarbon radical, branched or unbranched, saturated or unsaturated, having from 2 to 16 carbon atoms, and bearing at least one terminal alkyne group. Examples of the radical $R^1$ are ethynyl, propargyl, 3-butynyl, but-1-en-3-ynyl, 1-ethynyl-but-3-ynyl-, 4-pentynyl, pent-1-en-4-ynyl, 5-hexynyl, and hex-1-en-5-ynyl, particular preference being given to use of ethynyl and propargyl radicals.

Preference is also given to the radical $R^1$ being an amino- or amido-functional, or ether- or ester-functional hydrocarbon radical of the general formulae (II), (III), (IV), or (V)

where
x is a whole number from 1 to 16,
y is 0 or 1,
z is 1 or 2,
(y+z) is 2,
(CO) is a carbonyl function, and
$R^3$ is a hydrogen atom or a propargyl, 3-butynyl, 4-pentynyl, or 5-hexynyl radical,
with the proviso that the radical $R^1$ contains at least one terminal alkyne group.

The organosilicon compounds (A) used which have Si—O—C-bonded radicals having terminal carbon-carbon triple bonds preferably comprise linear or branched organopolysiloxanes composed of units of the general formula (VI)

where
R, $R^1$, a, and b
are defined as above,
with the proviso that the sum a+b is smaller than or equal to 3, and at least 2 radicals $R^1$ are present per molecule.

Monomeric organosilicon compounds (A) which have SiC-bonded radicals having aliphatic terminal carbon-carbon triple bonds preferably comprise compounds of the general formula (VII)

where
p is 0, 1 or 2,
q is 0, 1, 2, 3 or 4,
s is 0, 1 or 2,
t is 0, 1, 2, 3 or 4,
the sum (p+q+s+t) is always equal to 4, and
the radicals R and $R^1$ comply with the abovementioned conditions,
with the proviso that at least 2 radicals $R^1$ are present per molecule.

The molar mass of the compound (A) can vary widely, for example, from $10^2$ to $10^6$ g/mol, in each case as number average, determined by means of NMR. By way of example, the constituent (A) can be a relatively low-molecular-weight organic polyfunctional alkyne or a low-molecular-weight alkynyl-functional oligosiloxane, such as 1,2-diethynyltetramethyldisiloxane, but can also be a highly polymeric polydimethylsiloxane, e.g. with a molar mass of $10^5$ g/mol, having terminal Si-bonded ethynyl groups or having these groups along the chain. It is also possible, if appropriate, that some of the methyl groups in the polydimethylsiloxanes to have been replaced by 3,3,3-trifluoropropyl or phenyl groups.

The structure of the compound (A) is also undefined; in particular, the structure of a relatively high-molecular-weight, i.e. oligomeric or polymeric siloxane can be linear, cyclic, branched, or else resin-like, and network-like. Linear and cyclic polysiloxanes are preferably composed of units of the general formulae $R^3SiO_{1/2}$, $R^1R_2SiO_{1/2}$, $R^1RSiO_{2/2}$, and $R_2SiO_{2/2}$, where R and $R^1$ are defined as above. Branched and network-like polysiloxanes also contain trifunctional and/or tetrafunctional units, preferably those of the general formulae $RSiO_{3/2}$, $R^1SiO_{3/2}$, and $SiO_{4/2}$. It is, of course, also possible to use a mixture of different siloxanes complying with the criteria for compound (A).

The compound (A) most preferably comprises ethynyl-functional, essentially linear polydiorganosiloxanes with a viscosity of at least 0.01 Pa·s, more preferably from at least 0.1 Pa·s to 500,000 Pa·s, and most preferably at most 100,000 Pa·s, in particular at most 50,000 Pa·s, in each case at 25° C. It is preferable that at least 80% of the siloxane units of the compound (A) are those of the general formula $R_2SiO_{2/2}$.

The compound (C) can be silicon-free organic or organosilicon compounds having at least two carbon-bonded azide groups, or else a mixture of these. Compound (C) contains no terminal alkyne groups.

Examples of silicon-free organic compounds (C) are hydrocarbons such as aliphatic, cyclic, branched or unbranched, saturated or unsaturated or aromatic hydrocarbons, each of which can have heteroatoms selected from N, O, S, and P, and having from 6 to 50 carbon atoms, where these bear at least two carbon-bonded azide groups.

Examples of organic compounds (C) which bear two azide groups are 1,3-diazidopropane, 1,4-diazidobutane, 1,5-diazidopentane, 1,6-diazidohexane, cis/trans-1,2-diazidocyclopentane, trans-1,3-diazidocyclopentane, 3,6-diazidocyclohexene, and 1,2-bis(azidomethyl)benzene. Further examples are tris(2-azidoethyl)amines, N,N'-bis(2-azidoethyl)-N"-(2-bromoethyl)amine, 2-[bis(2-azidoethyl)amino]ethanol, erythro-1,2,3,4-tetraazidobutane, pentaerythrityl tetraazide, 3-azido-2,2-bisazidomethylpropan-1-ol, 1,3-diazido-2-azidomethyl-2-methylpropane, 1-azido-2,2-bisazidomethyl-3-propoxypropane, 1-azido-2,2-bisazidomethyldecane, 1-azido-2,2-bisazidomethyldodecane, 1-azido-2,2-bisazidomethyltetradecane, α,α,α-tris(azidomethyl)toluene, 1-azido-3-(3-azido-2,2-bisazidomethylpropoxy)-2,2-bisazidomethylpropane, 2-nitro-2-azidomethyl-1,3-diazidopropane, 2-amino-2-azidomethyl-1,3-diazidopropane, 2,2-bis(azidomethyl)-1,3-propanediol, 2,4,6-tris(3-azidopropylamino)-1,3,5-triazine, and 2,4,6-tris(2-azidoethylamino)-1,3,5-triazine.

As organopolysiloxanes (C), which have carbon-bonded azide groups, preferably linear, cyclic or branched organopolysiloxanes composed of units of the general formula (VIII)

$$R'_cR^4_bSiO_{(4-c-d)/2} \qquad (VIII)$$

are used, where
R' is defined as for R,
$R^4$ is a monovalent, substituted or unsubstituted, SiC-bonded hydrocarbon radical having at least one carbon-bonded azide group,
c is 0, 1, 2 or 3 and
d is 0, 1, 2 or 3,
with the proviso that the sum c+d is smaller than or equal to 3 and at least 2 radicals $R^4$ are present per molecule.

The radical $R^4$ can be any desired group containing at least one azide function. If radical $R^4$ is an SiC-bonded, additionally substituted hydrocarbon radical, preferred additional substituents are halogen atoms, cyano radicals and —$OR^2$, where $R^2$ is defined as above.

Radical $R^4$ preferably is an aliphatic hydrocarbon radical, branched or unbranched, saturated or unsaturated, having from 2 to 16 carbon atoms, and bearing at least one carbon-bonded azide group. Examples of the radical $R^4$ are azidomethyl, 2-azidoethyl, 3-azidopropyl, and 4-azidobutyl, particular preference being given to 2-azidoethyl- and 3-azidopropyl radicals.

Preference is also given to the radical $R^4$ being an amino- or amido-functional, or ether- or ester-functional hydrocarbon radical of the general formulae (IX), (X), (XI) or (XII)

$$—(CH_2)_xN(CO)_yR^5_z \qquad (IX)$$

$$—(CH_2)_x(CO)_yNR^5_z \qquad (X)$$

$$—(CH_2)_xO(CO)_yR^5 \qquad (XI)$$

$$—(CH_2)_xO(CO)_yR^5 \qquad (XII)$$

where
x, y and z are defined as above,
(y+z) is equal to 2,
(CO) is a carbonyl function,
$R^5$ is a hydrogen atom, or an azidomethyl, 2-azidoethyl, 3 azidopropyl, or 4-azidobutyl radical,
with the proviso that the radical $R^4$ contains at least one carbon-bonded azide group.

Examples of monomeric organosilicon compounds (C) are compounds of the general formula (XIII)

$$R'_pR^4_qSi(OR')_s(OR^4)_t \qquad (XIII)$$

where
p, q, s and t are defined as above,
the sum (p+q+s+t) is always equal to 4 and
the radicals R' and $R^4$ comply with the abovementioned conditions,
with the proviso that at least 2 radicals $R^4$ are present per molecule.

The molar mass of the compound (C) can also vary widely, for example, from $10^2$ to $10^6$ g/mol, in each case as number average, determined by means of NMR. By way of example, the compound (C) can involve a relatively low-molecular-weight organic polyfunctional azidoalkane or a low-molecular-weight azido-functional oligosiloxane, such as 1,2-di(3-azidopropyl)tetramethyldisiloxane, but can also involve a highly polymeric polydimethylsiloxane, e.g. with a molar mass of $10^5$ g/mol, having terminal Si-bonded azidoalkyl groups or having these groups within the chain. It is also possible, if appropriate, that some of the methyl groups in the polydimethylsiloxanes used have been replaced by 3,3,3-trifluoropropyl or phenyl groups.

The structure of the compound (C) is also undefined; in particular, the structure of a relatively high-molecular-weight, i.e. oligomeric or polymeric siloxane can be linear, cyclic, branched, or else resin-like, and network-like. Linear and cyclic polysiloxanes are preferably composed of units of the general formulae $R'_3SiO_{1/2}$, $R^4R'_2SiO_{1/2}$, $R^4R'SiO_{2/2}$, and $R'_2SiO_{2/2}$, where R' and $R^4$ are defined as above.

Branched and network-like polysiloxanes also contain trifunctional and/or tetrafunctional units, preferably those of the general formulae $R'SiO_{3/2}$, $R^4SiO_{3/2}$, and $SiO_{4/2}$. It is, of course, also possible to use a mixture of different siloxanes complying with the criteria for compound (C).

The compound (C) particularly preferably comprises azido-functional, essentially linear polydiorganosiloxanes with a viscosity of at least 0.01 Pa·s, more preferably from at least 0.1 Pa·s to 500,000 Pa·s, and most preferably at most 100,000 Pa·s, in particular at most 50,000 Pa·s, in each case at 25° C. It is preferable that at least 95% of the siloxane units of the compound (C) are those of the general formula $R'_2SiO_{2/2}$.

It is, of course, also possible to use a mixture of different compounds (C). In particular, the compounds (C) can also, if appropriate, simultaneously comprise aliphatically unsaturated groups, in addition to the obligatory azido-substituted alkyl groups.

The amount of compound (C) present in the crosslinkable silicone compositions (S) is preferably such that the molar ratio of azide groups to terminal alkyne groups from compounds (A) is from 0.1 to 10, more preferably from 0.2 to 5.

The compounds (A) and (C) are preferably commercially available products or can be produced by known chemical methods.

The silicone compositions (S) can also comprise, instead of compounds (A) and/or (C), organopolysiloxanes of the type (B) which simultaneously have aliphatic terminal carbon-carbon triple bonds and carbon-bonded azide groups. The silicone compositions (S) can also comprise all three of the compounds (A), (B) and (C).

If organopolysiloxanes (B) are used, these preferably are those composed of units of the general formulae (XIV),

where
R" is defined as for R,
$R^1$ and $R^4$ are defined as stated above for these,
e is 0, 1, 2 or 3,
f is 0, 1 or 2, and
g is 0, 1 or 2,
with the proviso that the sum (e+f+g) is smaller than or equal to 3 and at least 2 radicals $R^1$ and simultaneously at least 2 radicals $R^4$ are present per molecule.

It is particularly preferable to use linear organopolysiloxanes (B), which are composed of units of the formula $R''_3SiO_{1/2}$, $R''_2SiO_{1/2}$, $R''_2R^1SiO_{1/2}$, $R''_2R^4SiO_{1/2}$, $R''R^1O_{2/2}$, and $R''R^4O_{2/2}$.

Examples of branched organopolysiloxanes (B) are those composed of $SiO_{4/2}$, $R''_3SiO_{1/2}$, $R''_2R^4SiO_{1/2}$, and $R''_2R^1SiO_{1/2}$ units, these being known as MQ resins, where these resins can also contain $R''SiO_{3/2}$, $R^1SiO_{3/2}$, $R^4SiO_{3/2}$, $R''R^1O_{2/2}$, $R''R^4O_{2/2}$, and $R''_2SiO_{2/2}$ units.

Examples of monomeric organosilicon compounds (B) are compounds of the general formula (XV)

where
h is 0 or 1,
i is 0, 1, 2, 3 or 4,
j is 0, 1, 2, 3 or 4,
u is 0 or 1,
v is 0, 1, 2, 3 or 4,
w is 0, 1, 2, 3 or 4,
the sum (h+i+j+u+v+w) is always equal to 4, and
the radicals R" and $R^4$ comply with the abovementioned conditions,
with the proviso that at least one radical $R^1$ and at least one radical $R^4$ is present per molecule, and also that the total number of the radicals ($R^1+R^4$) per molecule is at least 3.

The average viscosity of the organopolysiloxanes (B) is preferably at least 0.01 Pa·s, more preferably from at least 0.1 Pa·s to 500,000 Pa·s, and most preferably at most 100,000 Pa·s, and in particular at most 50,000 Pa·s, in each case at 25° C. The organopolysiloxanes (B) can be produced by conventional chemical methods.

Preferred silicone compositions (S) which can be crosslinked via the "click reaction" comprise
 at least one compound each of (A), (C) and (D) or
 at least one compound each of (A), (B) and (D) or
 at least one compound each of (B), (C) and (D) or
 at least one compound each of (B) and (D) or
 at least one compound each of (A), (B), (C) and (D).

The copper catalyst (D) contains copper in elemental form or in the form of one or more compounds, and is a useful catalyst for the "click reaction" explained above.

Examples of copper catalysts (D) are:
 elemental copper, preferably in the form of powder, or else in any other form, either via direct addition or via use of reaction vessels or, respectively, surfaces which are composed of copper or of copper-containing alloys (bronze, brass).
 Cu(I) salts such as copper(I) halides, e.g. copper(I) iodide, copper(I) bromide, copper(I) chloride, tetrakisacetonitrilocopper(I) hexafluorophosphate, triphenylphosphinecopper(I) bromide, copper(I) triflate, copper(I) tetrafluoroborate, copper(I) acetate, and copper(I) nitrate.
 In addition, mixtures which under the reaction conditions stated generate Cu(I) ions, e.g. mixtures composed of copper(II) salts and polytriazole compounds such as tris[(1-benzyl-1H-1,2,3-triazol-4-yl)methyl]amine (TBTA), or a mixture composed of copper(II) salts and at least one additive, such as sodium ascorbate, elemental copper, or secondary amines such as diisopropylamine, tertiary amines such as triethylamine, diisopropylethylamine or pentamethyldiethylenetriamine (PMDETA).
 The Cu(II) salts used in these mixtures are preferably copper(II) sulfate, copper(II) chloride, copper(II) nitrate, copper (II) carbonate or copper(II) acetate (each with or without water of crystallization).
 In abovementioned mixtures it is also possible, instead of Cu(II) salts, to use elemental copper as source of Cu(I) ions.
 It is also possible to utilize mixtures composed of a phosphane, e.g. tris(carboxyethyl)phosphane (TCPE), and of a copper source, such as elemental copper, or Cu(I) salts or Cu(II) salts.
 All of the abovementioned copper compounds and reaction mixtures can also have been adsorbed on suitable support materials (e.g. activated charcoal, fine-particle silicas, organic polymeric resins), or can be present in the form of metal-complex compound covalently bonded on these.

All of the abovementioned copper catalysts (D) likewise can be mixed in any oxidation state with one another and, if appropriate, with the abovementioned additives, in any desired ratio.

The quantitative proportion added of copper catalysts (D), based in each case on the total weight of the silicone compositions (S), is preferably at least 0.00001%, more preferably at least 0.0001% and most preferably at least 0.001%, and at most 20%, more preferably at most 5% and most preferably at most 2%.

It is also possible that further constituents (E) or (F) are present alongside the abovementioned constituents (A), (B), (C) and (D) in the silicone compositions (S).

Examples of constituents (E) are stabilizers, and these serve to adjust the processing time and crosslinking rate of the silicone compositions (S) as desired. These stabilizers are very well known from previous publications in the sector of "click chemistry". They generally involve organic, nitrogen-containing compounds, such as amines, amides, nitriles, imidazoles, pyridines, pyrroles, and triazoles. Other compounds that can also be used for this purpose are phosphanes and phosphites, and also organosilicon compounds which bear organic radicals, where these include nitrogen or phosphorus as heteroatoms.

Examples of organic compounds (E) are amines such as secondary amines, e.g. diisopropylamine, tertiary amines, e.g. triethylamine, diisopropylethylamine, or pentamethyldiethylenetriamine (PMDETA), and cyclic amines, e.g. piperidine, piperazine or morpholine. Other examples are aromatic heterocycles, e.g. pyridine, 2,4-lutidine, 2,6-lutidine, collidine, pyrrole, and imidazole, and polytriazole compounds, such as tris[(1-benzyl-1H-1,2,3-triazol-4-yl)methyl]amine (TBTA).

Examples of organosilicon compounds (E) are (N cyclohexylamino-methyl)triethoxysilane, (N-cyclohexylaminomethyl)methyldiethoxysilane, (N-phenylaminomethyl)trimethoxysilane, (N-phenylamino-methyl)methyldimethoxysilane, N-(2-aminoethyl)(3-aminopropyl)trimethoxysilane, (3-aminopropyl)triethoxysilane, N-(2-aminoethyl)(3-aminopropyl) methyldimethoxysilane, and (3-aminopropyl)trimethoxysilane. It is, of course, also possible to use a mixture of different compounds (E).

The action of these additives (E) depends on their chemical structure, and they therefore have to be determined individually. The action of the additions (E) is generally based either on their basic character, which facilitates the formation of the copper acetylide, or on stabilization of the Cu(I) ion via formation of complex compounds.

A further advantage of these polar additives (E) is that the admixture of these compounds to the silicone compositions (S) can achieve improved self-adhesion of the crosslinked rubber compositions on various materials. A general disadvantage of silicone elastomers is known to be the low level of interaction (low adhesion) with other materials such as metals and polymers, necessitating admixture of adhesion-promoting additives. The platinum catalysts present in addition-crosslinkable silicone compositions (S) are known to react very sensitively to polar additives (such as compounds (E)), losing their catalytic activity. The tin catalysts present in condensation-crosslinkable silicone compositions (S) also exhibit a reduction in their reactivity after admixture of compounds (E). In contrast to this, additions (E) in the silicone compositions (S) actually have favorable effects (stabilization, reactivity increase).

The quantitative proportion added of stabilizers and stabilizer mixture added is preferably at least 0.0001%, with greater preference at least 0.001% and with particular preference at least 0.01% and at most 20%, more preferably at most 5% and most preferably at most 2%, based in each case on the total weight of the silicone compositions (S).

Any of the further additives which have also been used hitherto for the production of addition-crosslinkable or condensation-crosslinkable compositions are components (F). Examples of reinforcing fillers which can be used as component (F) in the silicone compositions (S) are fumed or precipitated silicas with BET surface areas of at least 50 m²/g, and also carbon blacks and activated charcoals, e.g. furnace black and acetylene black, preference being given to fumed and precipitated silicas with BET surface areas of at least 50 m²/g. The silica fillers mentioned can have hydrophilic character or can have been hydrophobized by known processes. For mixing to incorporate hydrophilic fillers, it is necessary to add a hydrophobizing agent. The content of actively reinforcing filler (F) in the crosslinkable silicone compositions (S) is in the range from 0 to 70% by weight, preferably from 0 to 50% by weight.

The silicone composition (S) can optionally comprise, as constituents (F), a proportion of up to 70% by weight, preferably from 0.0001 to 40% by weight, of further additives. Examples of these additives can be inert fillers, polyorganosiloxanes of the resin type, differing from the siloxanes (A), (B), and (C), reinforcing and non-reinforcing fillers, fungicides, fragrances, rheological additives, corrosion inhibitors, oxidation inhibitors, light stabilizers, flame retardants, and agents for influencing electrical properties, dispersing agents, solvents, adhesion promoters, pigments, dyes, plasticizers, organic polymers, heat stabilizers, etc. Among these are additives such as powdered quartz, diatomaceous earths, clays, chalk, lithopones, carbon blacks, graphite, metal oxides, metal carbonates, metal sulfates, metal salts of carboxylic acids, metal dusts, fibers such as glass fibers, synthetic fibers, plastics powders, metal dusts, dyes, pigments, etc.

The silicone compositions (S) can, if necessary, be emulsified, suspended, dispersed or dissolved in liquids. The compositions can, in particular, as a function of viscosity of the constituents, and also the filler content, be of low viscosity and pourable, have paste-like consistency, be pulverulent, or else be conformable, high-viscosity masses, in the manner known to be feasible for the compositions which in technical circles are frequently termed RTV-1, RTV-2, LSR and HTV. In particular, if the compositions have high viscosity, they can be prepared in the form of granules. The components used here can have been incorporated here, mixed or separately, in various granulate particles. The elastomeric properties of the crosslinked silicone compositions (S) equally cover the entire spectrum, beginning with extremely soft silicone gels and proceeding by way of rubbery materials, to highly crosslinked silicones which behave like glasses.

The silicone compositions (S) can be produced by known processes, for example, via homogeneous mixing of the individual components. The sequence here can be as desired, but it is preferable to mix the copper catalyst (D) homogeneously with a mixture composed of (A), (C) and, if appropriate, (E) and (F). The copper catalyst (D) used here can be incorporated in the form of solid substance or in the form of solution, for example dissolved in a suitable solvent, or in the form of what is known as a masterbatch, homogeneously mixed with a small amount of (A), or (A) with (F).

Each component (A) to (F) can be a single type of this component, or else a mixture of two or more different types of this component.

The silicone compositions (S), crosslinkable via cycloaddition between carbon-bonded azide groups and terminal alkynes, can be crosslinked under conditions identical with those for the compositions known hitherto, which are crosslinkable via a hydrosilylation reaction. The crosslinking temperatures are preferably from −30 to 220° C., more preferably from 10 to 100° C., and the pressure is preferably from 900 to 1100 hPa. However, it is also possible to use higher or lower temperatures and pressures.

The present invention further provides moldings produced via crosslinking of the silicone compositions (S).

The silicone compositions (S) and also the crosslinking products produced therefrom can be used for any of the purposes for which organopolysiloxane compositions crosslinkable to form elastomers and the elastomers prepared therefrom are useful. These encompass, by way of example, silicone coating and impregnation of any desired substrates, the production of moldings, for example, by the injection-molding process, vacuum-extrusion process and other extrusion processes, mold-casting and compression molding, and other casting processes, and use as sealing, embedding and potting compounds, etc.

The respective definitions of all of the above symbols in the above formulae are independent of one another. The silicon atoms in all of the formulae are tetravalent.

EXAMPLES

In the examples described below, all of the data on parts and percentages are based on weight unless otherwise stated. Unless otherwise stated, the examples below are carried out at the pressure of the ambient atmosphere, i.e. at about 1000 hPa, and at room temperature, i.e. at about 20° C., or at a temperature which results on combining the reactants at room temperature without additional heating or cooling. All of the viscosity data below are based on a temperature of 25° C. The mixtures described below were produced with the aid of an RE 162 mixer from Janke & Kunkel IKA-Labortechnik.

Example 1

1.55 g of tetrakis(acetonitrilo)copper(I) hexafluorophosphate were dissolved in 5 ml of acetonitrile and mixed with 9.5 g of the crosslinking agent pentaerythrityl tetraazide. The mixture was freed from volatile constituents in vacuo and mixed homogeneously with 50.0 g of a dipropargylaminopropyl-terminated polydimethylsiloxane having the following structural formula.

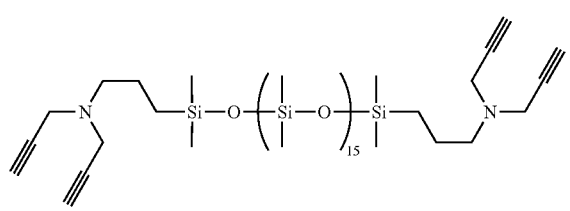

A vulcanization time of 4 h at 25° C. gave a tack-free solid vulcanizate with hardness of 95 Shore A.

Example 2

1.0 g of copper(I) iodide was dissolved in 5 ml of acetonitrile and mixed with 9.0 g of the crosslinking agent pentaerythrityl tetraazide. The mixture was freed from volatile constituents in vacuo and mixed homogeneously with 50.0 g of a dipropargylaminopropyl-terminated polydimethylsiloxane having the following structural formula.

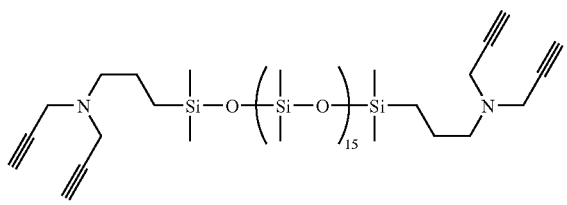

A vulcanization time of 4 h at 100° C. gave a tack-free solid vulcanizate with hardness of 85 Shore A.

Example 3

0.5 g of tetrakis(acetonitrilo)copper(I) hexafluorophosphate was dissolved in 3 ml of acetonitrile and mixed with 4.0 g of the crosslinking agent pentaerythrityl tetraazide. The mixture was freed from volatile constituents in vacuo and mixed homogeneously with 50.0 g of a dipropargylaminopropyl-terminated polydimethylsiloxane having the following structural formula.

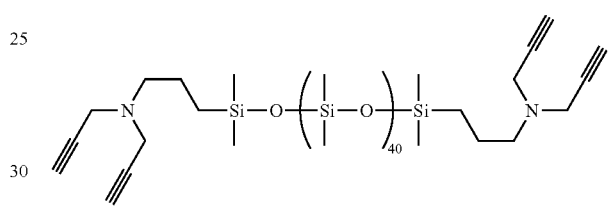

A vulcanization time of 12 h at 25° C. gave a tack-free solid elastomeric vulcanizate with hardness of 45 Shore A.

Example 4

0.4 g of tetrakis(acetonitrilo)copper(I) hexafluorophosphate was dissolved in 3 ml of acetonitrile and mixed with 3.8 g of the crosslinking agent pentaerythrityl tetraazide. The mixture was freed from volatile constituents in vacuo and mixed homogeneously with 50.0 g of a dipropargylaminopropyl-terminated polydimethylsiloxane having the following structural formula.

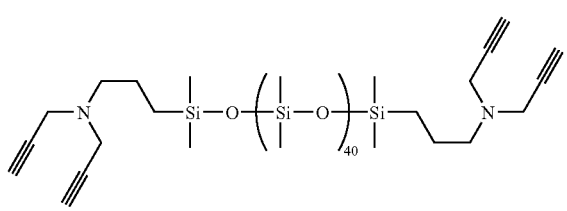

A vulcanization time of 9 h at 100° C. gave a tack-free solid elastomeric vulcanizate with hardness of 35 Shore A.

Example 5

0.06 g of tetrakis(acetonitrilo)copper(I) hexafluorophosphate was dissolved in 1 ml of acetonitrile and mixed with 0.4 g of the crosslinking agent pentaerythrityl tetraazide. The mixture was freed from volatile constituents in vacuo and mixed homogeneously with 50.0 g of a dipropargylaminopropyl-terminated polydimethylsiloxane having the following structural formula.

A vulcanization time of 36 h at 25° C. gave a tack-free elastomeric vulcanizate with hardness of 20 Shore A.

Example 6

0.09 g of tetrakis(acetonitrilo)copper(I) hexafluorophosphate was dissolved in 1 ml of acetonitrile and mixed with 0.6 g of the crosslinking agent pentaerythrityl tetraazide. The mixture was freed from volatile constituents in vacuo and mixed homogeneously with 50.0 g of a dipropargylaminopropyl-terminated polydimethylsiloxane having the following structural formula.

A vulcanization time of 24 h at 100° C. gave a tack-free elastomeric vulcanizate with hardness of 30 Shore A.

Example 7

Component 1 is composed of a homogeneous mixture of 35 g of a surface hydrophobized fumed silica with BET surface area of 130 g/m$^2$, 50 g of an α,ω-ethynyl-terminated polydimethylsiloxane with viscosity of 1000 mPas, 35 g of an α,ω-(3-azidopropyl)-terminated polydimethylsiloxane with viscosity of 1000 mPas, 4 g of a trimethylsilyl-terminated polydimethylsiloxane with viscosity of 30,000 mPas and 4 g of an azido-functional polyorganosiloxane crosslinking agent with viscosity of 250 mPas having the following structural formula.

Component 2 is composed of a homogeneous mixture of 20 g of an α,ω-ethynyl-terminated polydimethylsiloxane with viscosity of 1000 mPas, 6 g of an α,ω-ethynyl-terminated polydimethylsiloxane with viscosity of 20.000 mPas, 20 g of an α,ω-ethynyl-terminated polydimethylsiloxane with viscosity of 200 mPas, 1.5 g of triphenylphosphinecopper(I) bromide and 1 g of pentamethyldiethylenetriamine.

After mixing for homogeneous incorporation of 5 g of component 2 into 50 g of component 1, a vulcanization time of 14 h at 25° C. gave a tack-free elastomeric vulcanizate with hardness of 30 Shore A.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A multicomponent silicone composition which is crosslinkable via a click reaction and which, after mixing of the individual components, hardens to give an elastomeric material, comprising:
    at least one compound (A) or (B),
    at least one compound (B) or (C), and
    at least one Cu catalyst (D),
where
    (A) is an organic compound or an organosilicon compound which possesses at least two moieties having terminal aliphatic carbon-carbon triple bonds having terminally bonded hydrogen;
    (B) is an organic compound or an organosilicon compound which possesses at least two moieties having terminal aliphatic carbon-carbon triple bonds having terminally bonded hydrogen and simultaneously at least two moieties having carbon-bonded azide groups;
    (C) is an organic compound or an organosilicon compound which possesses at least two moieties having carbon-bonded azide groups;
with the proviso that a component does not simultaneously comprise compounds of the group (B) and (D), or simultaneously comprise (A), (C) and (D), and
that at least one of the compounds used, selected from (A), (B) and (C), is an organosilicon compound.

2. The silicone composition of claim 1, wherein organosilicon compounds (A) comprise organopolysiloxanes containing units of the formula (I)

$$R_a R^1_b SiO_{(4-a-b)/2},\quad\text{(I)}$$

where
    R is an organic or inorganic radical free from aliphatic carbon-carbon triple bonds,
    $R^1$ is a monovalent, substituted or unsubstituted, SiC-bonded hydrocarbon radical having at least one aliphatic terminal carbon-carbon triple bond,
    a is 0, 1, 2 or 3 and
    b is 0, 1, 2 or 3,
with the proviso that the sum a+b is smaller than or equal to 3, and at least 2 radicals $R^1$ are present per molecule.

3. The silicone composition of claim 1, wherein compounds (C) are silicon-free hydrocarbons having from 6 to 50 carbon atoms, which optionally contain heteroatoms selected from N, O, S, and P, and which bear at least two carbon-bonded azide groups.

4. The silicone composition of claim 1, wherein organopolysiloxanes (C) comprise linear, cyclic or branched organopolysiloxanes comprising units of the formula (VIII)

$$R'_c R^4_b SiO_{(4-c-d)/2},\quad\text{(VIII)}$$

where
    R' is defined as for R as claimed in claim 2,
    $R^4$ is a monovalent, substituted or unsubstituted, SiC-bonded hydrocarbon radical having at least one carbon-bonded azide group, c is 0, 1, 2 or 3 and d is 0, 1, 2 or 3, with the proviso that the sum c+d is smaller than or equal to 3 and at least 2 radicals $R^4$ are present per molecule.

5. The silicone composition of claim 1, comprising:
   at least one compound of each of (A), (C) and (D) or
   at least one compound of each of (A), (B) and (D) or
   at least one compound of each of (B), (C) and (D) or
   at least one compound of each of (B) and (D) or
   at least one compound of each of (A), (B), (C) and (D).

6. The silicone composition of claim 1, wherein the copper catalyst (D) is selected from the group consisting of elemental copper, Cu(I) salts, Cu(II) salts, and their mixtures.

7. The silicone composition of claim 1, wherein the quantitative proportion of copper catalysts (D) which is present, based on the total weight of the silicone composition, is from 0.0001% to 5%.

8. The silicone composition of claim 1, which comprises, as constituents (E), stabilizers which are selected from compounds containing organic nitrogen, phosphanes, phosphites and organosilicon compounds which bear organic moieties, where organic moieties include at least one of nitrogen or phosphorus as heteroatoms.

9. The silicone composition of claim 1, which comprises, as at least one constituent (F), additives which are selected from the group consisting of fillers, fungicides, fragrances, rheological additives, corrosion inhibitors, oxidation inhibitors, light stabilizers, flame retardants, agents for influencing electrical properties, dispersing agents, solvents, adhesion promoters, pigments, dyes, plasticizers, organic polymers, and heat stabilizers.

10. A process for the production of a silicone composition of claim 1, comprising mixing the following with one another:
    at least one compound (A) or (B),
    at least one compound (B) or (C), and
    at least one Cu catalyst (D).

11. A molding produced via crosslinking of the silicone composition of claim 1.

12. A silicone coating or impregnant, molding, casting, or sealing, embedding or potting compound, comprising a silicone composition of claim 1 or a crosslinked product thereof.

* * * * *